United States Patent
Shah

(10) Patent No.: US 8,146,039 B2
(45) Date of Patent: Mar. 27, 2012

(54) OPTIMAL DISTANCE BASED BUFFER TREE FOR DATA PATH AND CLOCK

(75) Inventor: Mrugesh Shah, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 433 days.

(21) Appl. No.: 12/340,193

(22) Filed: Dec. 19, 2008

(65) Prior Publication Data

US 2010/0162186 A1    Jun. 24, 2010

(51) Int. Cl.
    *G06F 17/50* (2006.01)
(52) U.S. Cl. ........ 716/114; 716/108; 716/111; 716/113; 716/132; 716/134
(58) Field of Classification Search .................. 716/108, 716/113, 114, 133–135; 703/19
See application file for complete search history.

(56) References Cited

U.S. PATENT DOCUMENTS

| | | | |
|---|---|---|---|
| 6,440,780 B1 * | 8/2002 | Kimura et al. | 438/129 |
| 2003/0014724 A1 * | 1/2003 | Kojima et al. | 716/10 |
| 2006/0041852 A1 * | 2/2006 | Drumm et al. | 716/10 |
| 2006/0190901 A1 * | 8/2006 | Lu et al. | 716/13 |

OTHER PUBLICATIONS

"Clock Routing for High-Performance ICs", by Michael A. B. Jackson, Arvind Srinivasan, E. S. Kuh, IEEE, @1990.*

* cited by examiner

*Primary Examiner* — Paul Dinh
*Assistant Examiner* — Nha Nguyen
(74) *Attorney, Agent, or Firm* — VanLeeuwen & VanLeeuwen; David Dalezal

(57) ABSTRACT

A device development tool selects a source component and identifies a plurality of sink components in a device design layout. The device development tool determines whether the sink components are configured in a single-sided layout, a multi-sided layout, or a multi-distance layout. Next, the device development tool computes a first level center of gravity for the plurality of sink components and also computes an X distance and a Y distance from the source component to the first level center of gravity. The device development tool then groups the plurality of sink components into sets and places buffers in the layout using an algorithm that is specific for the identified layout type.

20 Claims, 13 Drawing Sheets

OPTIMAL DISTANCE BASED BUFFER TREE FOR DATA PATH AND CLOCK

BACKGROUND OF THE INVENTION

1. Technical Field

The present invention relates to the design of integrated circuits and more specifically optimizing a buffer tree in an integrated circuit.

2. Description of the Related Art

During the development of an integrated circuit, electronic design automation (EDA) tools place source components and sink components at various locations during physical layout steps. As one skilled in the art can appreciate, "components" may be logic gates (AND, OR, NAND, etc.), latches, or other entities that provide or receive electrical signals, such as for data or clock information. A "source" is a component that delivers or drives a signal, and a "sink" is a component that receives or loads the signal. Many of the EDA tools available create buffer trees (e.g., drivers), which propagate the signals from source components to distant sink components, in a less than optimal manner due to a wide variety of sink component configurations and fanout considerations relative to the source component. As one skilled in the art can appreciate, a "buffer" receives an electrical signal from one component and retransmits the electrical signal to another component (or subsequent buffer). This can cause timing issues in the device's design due to the fact that each buffer introduces a delay between a source component and a sink component.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

Figure 1:
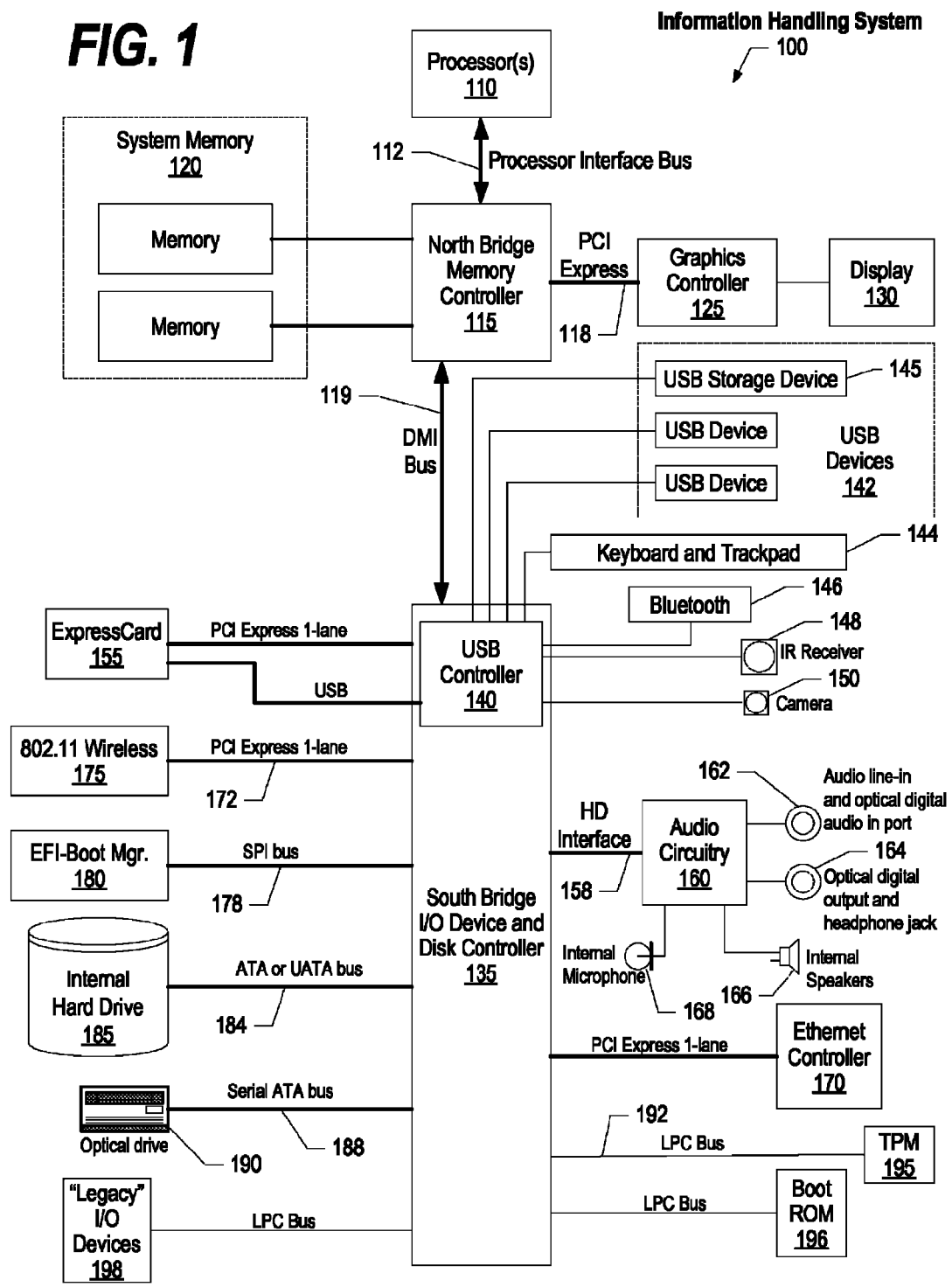
FIG. 1 is a block diagram of an information handling system in which the methods described herein can be implemented.
Figure 2:
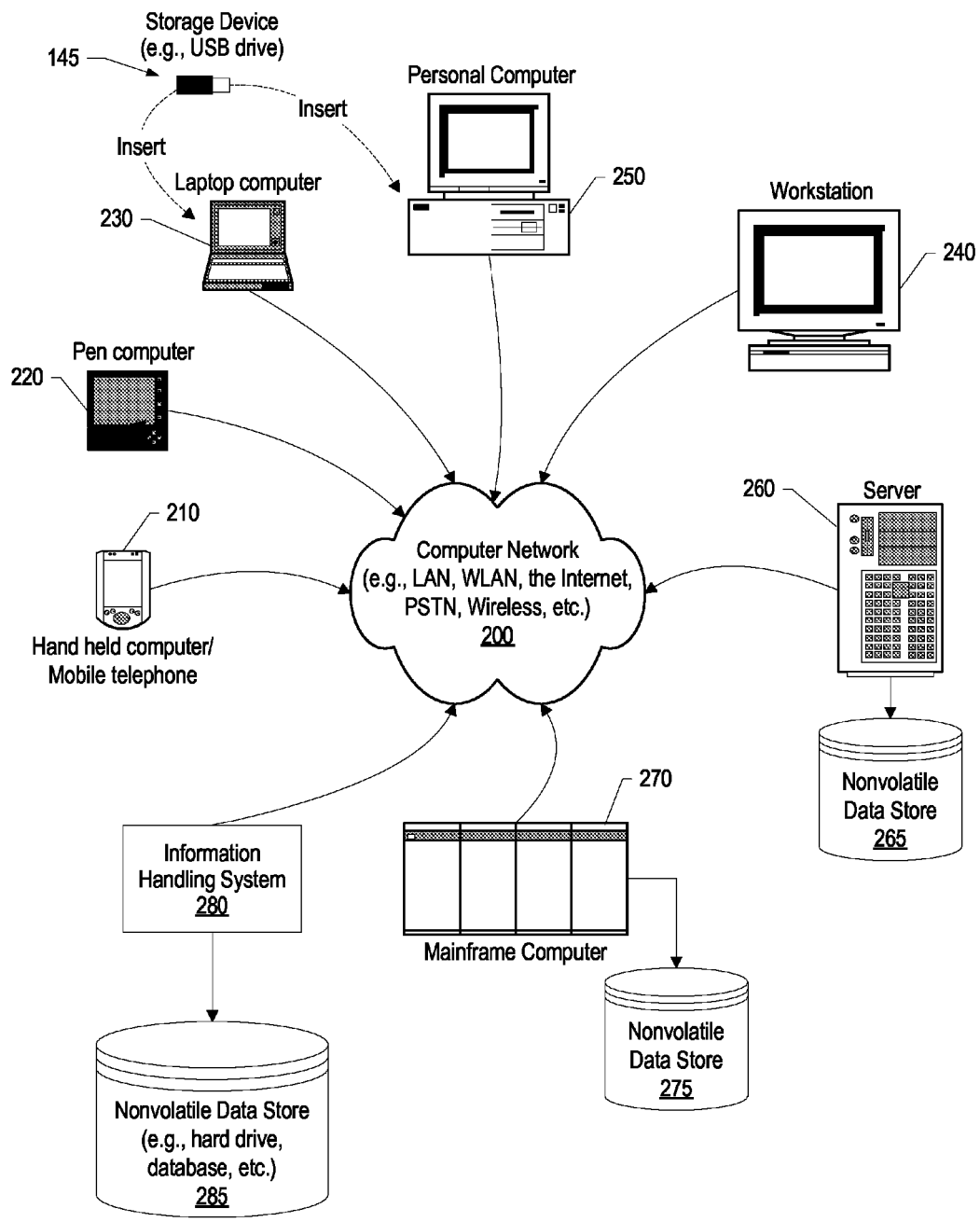
FIG. 2 provides an extension of the information handling system environment shown in FIG. 1 to illustrate that the methods described herein can be performed on a wide variety of information handling systems which operate in a networked environment.

The following detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy"

I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
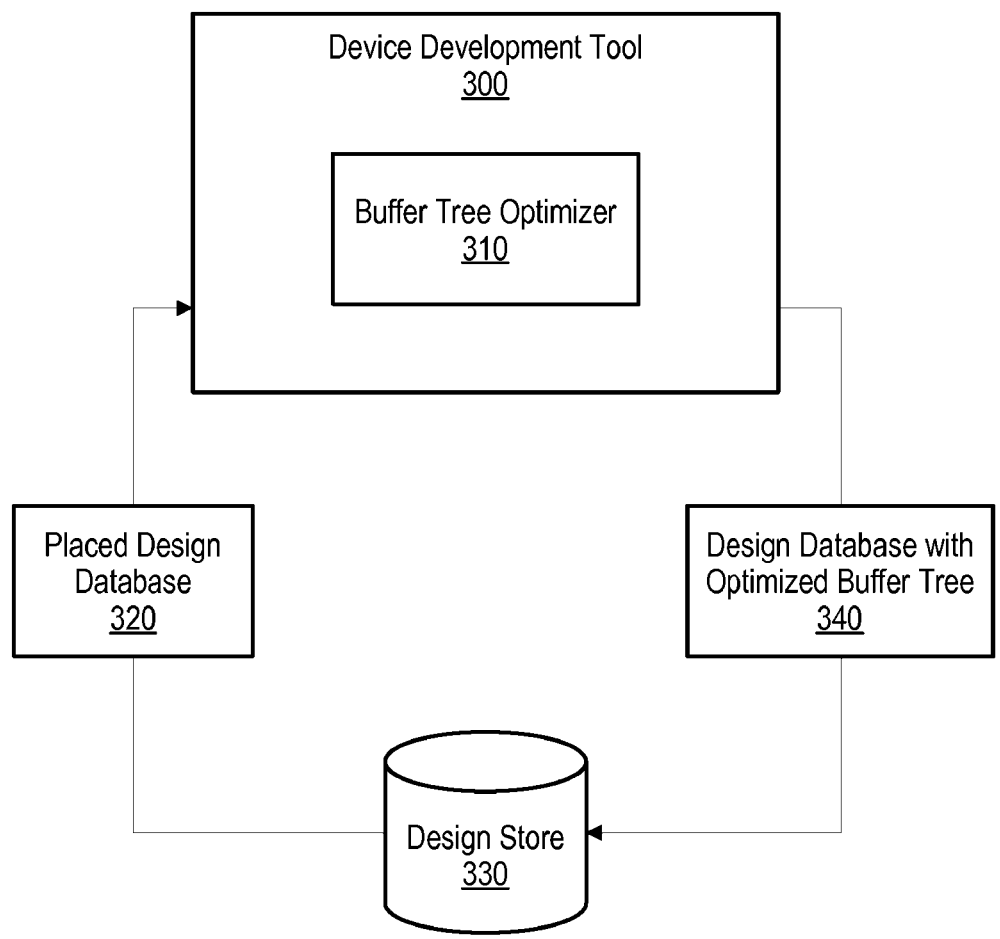
FIG. 3 is a diagram showing a device development tool optimizing a design's buffer tree utilizing the invention described herein.

FIG. 3 is a diagram showing a device development tool optimizing a design's buffer tree utilizing an embodiment of the invention described herein. Information handling system 100 (shown in FIG. 1) executes device development tool 300, which a developer utilizes to design a device (e.g., integrated circuit). During device development, device development tool 300 places components (gates, latches, etc.) to physically "layout" the device's design, which eventually is used to produce the device. During physical layout, device development tool 300 stores component placement information in design store 330 as placed design database 320. As those skilled in the art can appreciate, design store 330 may be stored on a nonvolatile storage area, such as internal hard drive 185 shown in FIG. 1.

Device development tool 300 utilizes buffer tree optimizer 310, which may be software code included in device development tool 310, during physical layout in order to optimize buffer trees included in the physical layout. Once the components are placed, device development tool 300 retrieves placed design database 320 from design store 330, and invokes buffer tree optimizer 310. Buffer tree optimizer 310 proceeds through a series of steps to identify critical paths and optimize the critical paths based upon sink component layout types and computed X distance and Y distance between a source component and a first level center of gravity of the sink components. As one skilled in the art can appreciate, the X distance is a physical distance along an X-axis in a horizontal direction relative to a device's physical layout, and the Y distance is a physical distance along a Y-axis in a vertical direction relative to a device's physical layout. In addition, as one skilled in the art can appreciate, the "center of gravity" of sink components may be the sum of x locations of the sinks divided by the number of sinks and the sum of y locations of the sinks divided by the number of sinks. For example, if sink1 is at (x1, y1), sink2 is at (x2, y2), and sink3 is at (x3, y3), then the "center of gravity" of above three sink components is ((x1+x2+x3)/3, (y1+y2+y3)/3). In another embodiment, the center of gravity is an average location of the weight of the sink components (see FIGS. 5-11 and corresponding text for further details). In one embodiment, the invention described herein may be applied to a 3-dimensional device layout, which is a physical layout that places components at "layers" that are on top of each other. In this embodiment, processing computes and utilizes a Z distance, which corresponds to a Z-axis perpendicular to the X-axis and the Y-axis.

Figure 4:
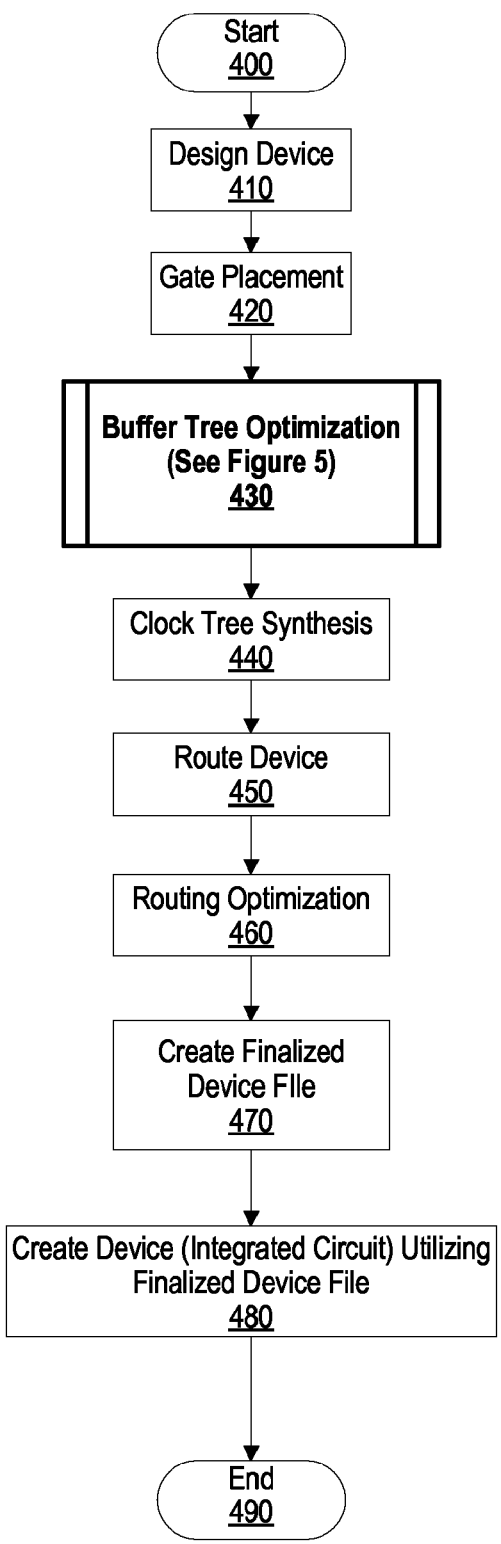
FIG. 4 is a high level flowchart showing steps taken in optimizing a buffer tree during device development.

Once optimized, device development tool 300 stores design database with optimized buffer tree 340 back into design store 330, which device development tool 300 utilizes during clock tree synthesis and device routing (see FIG. 4 and corresponding text for further details). In one embodiment, device development tool 300 may also utilize buffer tree optimizer 310 during clock tree synthesis in order to optimize clock tree buffers. In another embodiment, device development tool 300 may also utilize buffer tree optimizer 310 to perform buffer tree optimization after device development tool 300 initially routes the device. As one skilled in the art can appreciate, device development tool 300 may utilize inverters instead of buffers for various portions of buffer trees and/or clock trees.

FIG. 4 is a high level flowchart showing steps taken in a device development tool optimizing a buffer tree during device development. Device development processing commences at 400, whereupon a developer utilizes the device development tool to design a device at step 410. For example, the user may design a device and create an RTL (Register Transfer Level) netlist and a floor plan "def" (design exchange format) file. At step 420, the device development tool performs physical synthesis and places gates in the floor plan utilizing the RTL netlist and the floor plan def file. The floor plan includes initial gate placements, which includes buffers between source components and sink components. For example, an AND gate (source component) may drive an OR gate (sink component). In this example, the AND gate may be physically too far from the OR gate to drive the gate directly and, therefore the device development tool inserts a buffer between the AND gate and the OR gate.

After the initial layout, the device development tool performs buffer tree optimization. During this step, the device development tool identifies critical paths that include more than three buffer stages (e.g., for propagating source component signals to distant sink components) and optimizes the buffer trees accordingly (pre-defined process block 430, see FIG. 5 and corresponding text for further details).

Once buffer tree optimization is complete, the device development tool performs clock tree synthesis at step 440. In one embodiment, the invention described herein may also be used for clock tree synthesis in order to optimize clock tree buffers. At step 450, the device development tool routes the device based upon component placements and optimizations as discussed above.

Next, at step 460, the device development tool optimizes the device's routing in order to alleviate race conditions, etc.

In one embodiment, buffer trees may be optimized after the device development tool initially routes the device at step 450. Once the device development tool optimizes the routing, the device development tool creates a finalized device file at step 470, such as a graphic data system (GDS) file. At step 480, the device (e.g., integrated circuit) is created utilizing the finalized device file, and processing ends at 490.

Figure 5:
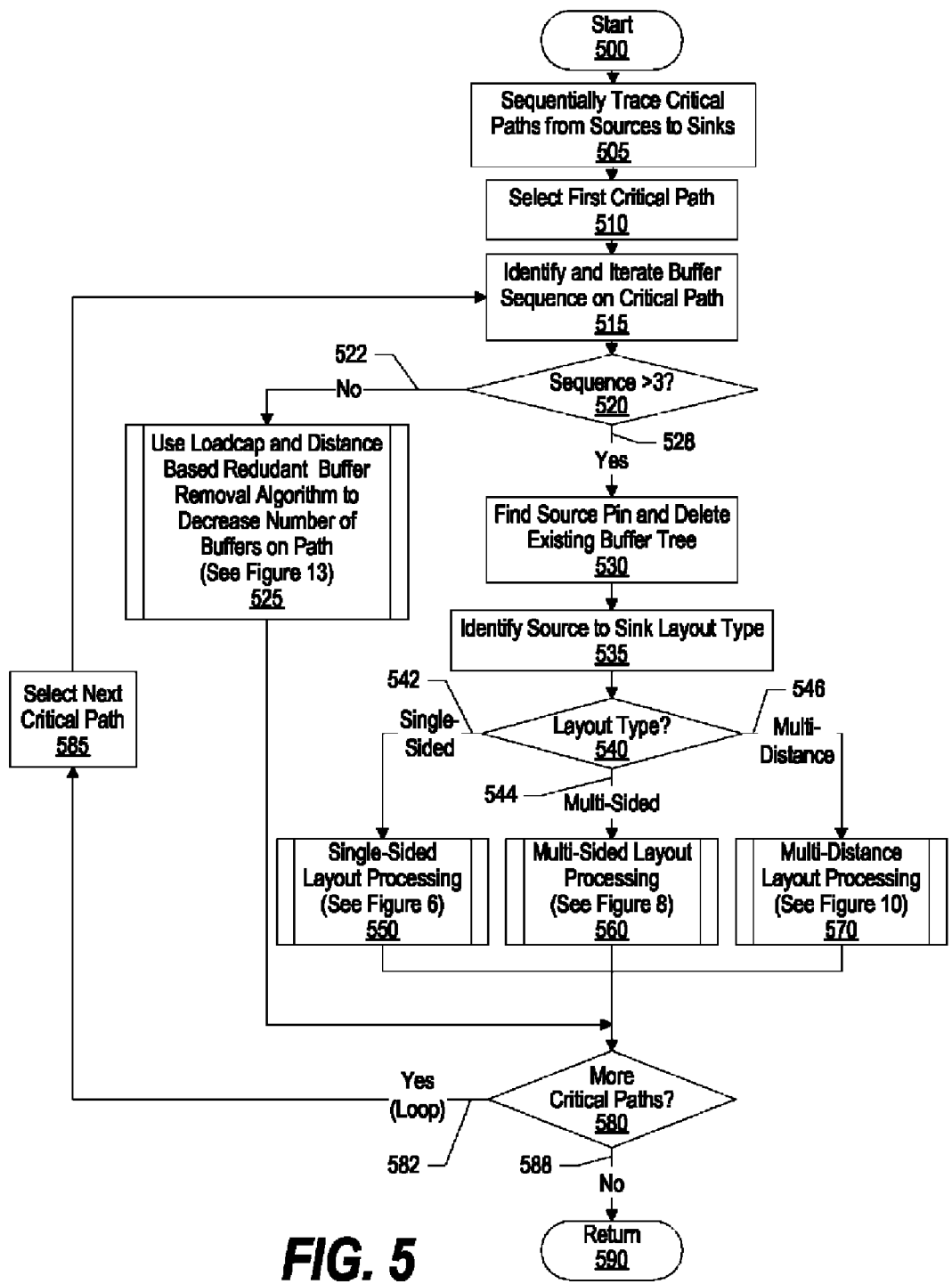
FIG. 5 is a flowchart showing steps taken in optimizing a buffer tree.

FIG. 5 is a flowchart showing steps taken in a device development tool optimizing a buffer tree. Processing commences at 500, whereupon processing sequentially traces critical paths (e.g. race conditions) from source components to sink components. For example, a device development tool may identify 300 critical paths in a design file that has timing constraints.

At step 510, processing selects one of the critical paths and, at step 515, processing identifies and iterates the buffer sequence along the critical path. For example, the buffer sequence may include multiple buffers in-line between the source component and one or more sink components based upon the distance between the two and/or based upon source component's drive capability.

A determination is made as to whether there are more than three buffer stages along the critical path (decision 520). If there are not more than three buffer stages along the critical path, decision 520 branches to "No" branch 522 whereupon processing uses a load capacitance (loadcap) and distance based algorithm to decrease the number of buffer stages along the critical path (pre-defined process block 525, see FIG. 13 and corresponding text for further details).

On the other hand, if there are more than three buffer stages along the critical path, decision 520 branches to "Yes" branch 528, whereupon processing identifies the source component pin and deletes the existing buffer tree that couples the source component to the sink components (step 530).

Next, processing identifies a physical "layout type" based upon the location of the sink components compared to the source component (step 535). Each physical layout type corresponds to a particular layout algorithm. Three algorithms discussed herein correspond to a single-sided layout, a multi-sided layout, and a multi-distance layout. A single-sided layout type is defined as all sink components residing on one side of the source component, such as all on top, all on bottom, all to the left, or all to the right (see FIG. 7 and corresponding text for further details). A multi-sided layout type is defined as some sink components residing on one side of the source component, and other sink components residing on a different side of the source component (see FIG. 9 and corresponding text for further details). And, a multi-distance layout type is defined as some sink components residing at one buffer distance and other sink components residing at a different buffer distance (see FIG. 11 and corresponding text for further details). As one skilled in the art can appreciate, other variations of algorithms may be utilized to generate an optimized buffer tree.

A determination is made as to the layout type of the sink components (decision 540). If the layout type is single-sided, decision 540 branches to "Single-Sided" branch 542 whereupon processing optimizes the buffer tree using a single-sided algorithm (pre-defined process block 550, see FIG. 6 and corresponding text for further details). Or, if the layout type is multi-sided, decision 540 branches to "Multi-Sided" branch 544 whereupon processing optimizes the buffer tree using a multi-sided algorithm (pre-defined process block 560, see FIG. 8 and corresponding text for further details). On the other hand, if the layout type is multi-distance, decision 540 branches to "Multi-Distance" branch 546 whereupon processing optimizes the buffer tree using a multi-distance algorithm (pre-defined process block 570, see FIG. 10 and corresponding text for further details). In one embodiment, processing generates a buffer chain from a source component to distant sink components, and then utilizes one or more of the above algorithms accordingly to complete the buffer tree (see FIG. 12 and corresponding text for further details).

A determination is made as to whether there are more critical paths in which to analyze (decision 580). If there are more critical paths in which to analyze, decision 580 branches to "Yes" branch 582, which loops back to select (step 585) and analyze the next critical path. This looping continues until there are no more critical paths to optimize, at which point decision 580 branches to "No" branch 588, whereupon processing returns at 590.

Figure 6:
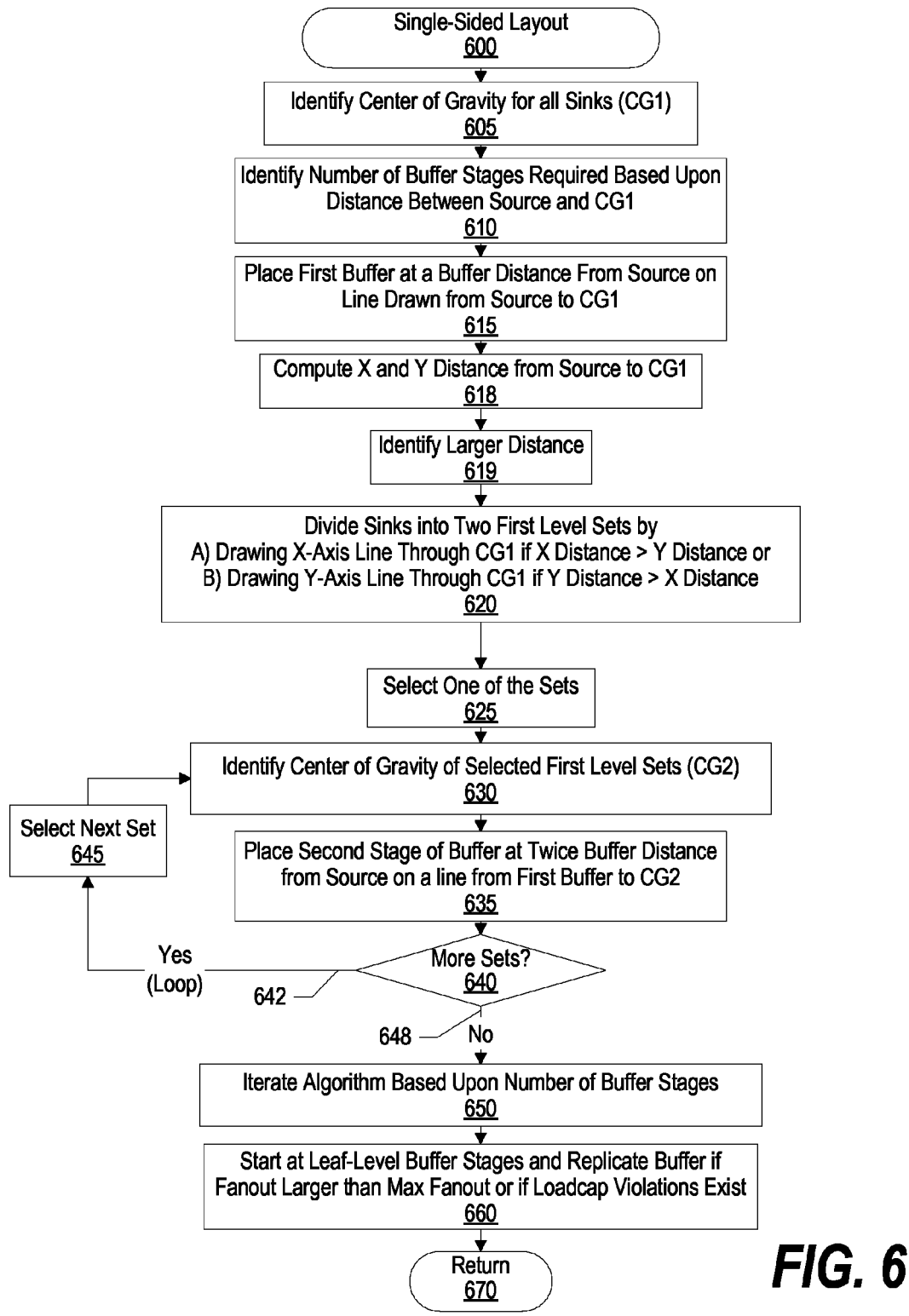
FIG. 6 is a flowchart showing steps taken in using a single-sided buffer optimization algorithm to optimize a buffer tree for sink components that are organized in a single-sided layout configuration.
Figure 7:
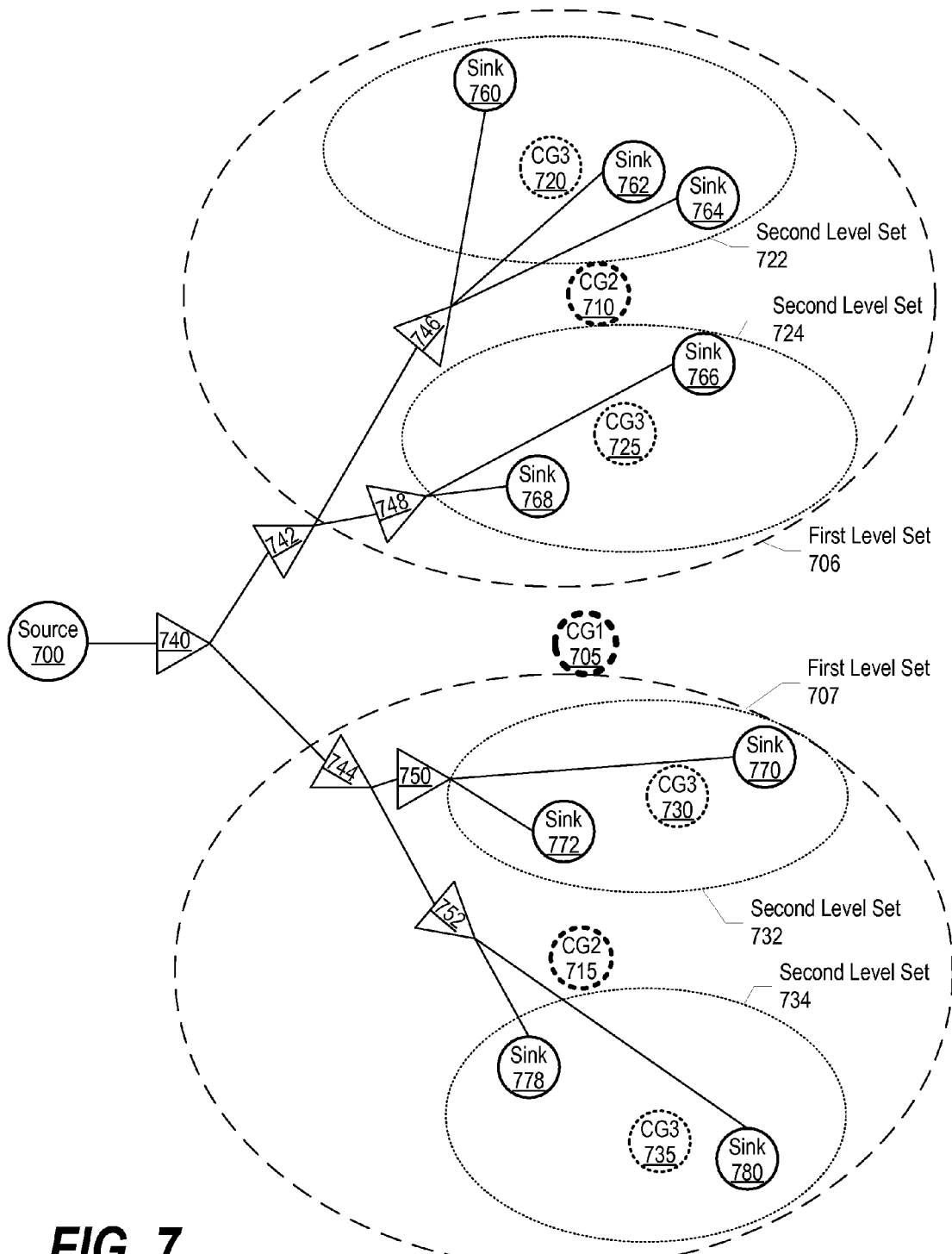
FIG. 7 is an exemplary diagram of an optimized buffer tree for a single-sided layout.

FIG. 6 is a flowchart showing steps taken in a device development tool using a single-sided buffer optimization algorithm to optimize a buffer tree for sink components that are organized in a single-sided layout configuration. FIG. 7 is an exemplary diagram of a physical layout that includes an optimized buffer tree for a single-sided layout. Referring to FIG. 6, processing commences at 600, whereupon processing identifies a first level center of gravity (CG1) for all sink components (step 605). Referring to FIG. 7, processing identifies CG1 705 as the first level center of gravity for sink components 760 through 776. As discussed earlier, the center of gravity of sink components may be the sum of x locations of the sinks divided by the number of sinks and the sum of y locations of the sinks divided by the number of sinks. In one embodiment, the center of gravity may be equidistant between sink components 760 through 776.

Processing, at step 610, identifies a number of required buffer stages between the source component and CG1. For example, a buffer (e.g., driver) may be able to drive a sink component at a particular distance based upon load capacitance and drive strength, which is referred to as the "buffer distance." In this example, processing identifies how many buffer distances are between the source component and CG1, which correlates to the number of required buffer stages (buffers). Referring to FIG. 7, processing identifies how may buffer stages are required between source 700 and CG1 705.

At step 615, processing places a first buffer, at a buffer distance, in-line between the source and CG1. Referring to FIG. 7, processing places buffer 740 at a buffer distance from source 700 at a location that is in-line with source 700 and CG1 705.

Processing, at step 618, computes an X distance and a Y distance that CG1 is away from the source component. The X distance is a horizontal distance (X-axis) on the physical layout between the source and CG1 and the Y distance is a vertical distance (Y-axis) on the physical layout between the source and CG1. As those skilled in the art will appreciate, other orientation mechanisms may be used to specify CG1's relative location to the source component. In one embodiment, the invention described herein may be applied to a 3-dimensional device layout. In this embodiment, processing computes a Z distance, which corresponds to a Z-axis perpendicular to the X-axis and the Y-axis.

Processing, at step 619 identifies whether the X distance or the Y distance is larger in order to determine whether to use an X algorithm or a Y algorithm. Next, processing divides the sink components into two first level sets by drawing (computing) either an X-axis line or a Y-axis line through CG1 based upon whether the X distance is larger than the Y distance. Referring to FIG. 7, the example shows that the X distance between source 700 and CG1 705 is larger than the Y distance. As such, an X-axis line (horizontal line parallel to the X-axis) is drawn through CG1 705, which results in first level set 706 and first level set 707. In situations when the Y distance is greater than the X distance, processing draws a Y-axis line (vertical line parallel to the Y-axis) through CG1.

Once the first level sets are identified, processing selects one of the first level sets at step 625, and identifies a second level center of gravity (CG2) for the selected first level set (step 630). Referring to FIG. 7, processing identifies CG2 710 and first level set 706's center of gravity. At step 635, processing places a buffer at twice the buffer distance from source 700 that is in-line between the first buffer (step 615) and CG2. Referring to FIG. 7, processing places buffer 742 at a location that is twice the buffer distance from source 700 and is in-line between buffer 740 and CG2 710.

A determination is made as to whether there are more sets to process (decision 640). If there are more first level sets in which to process, decision 640 branches to "Yes" branch 642, which loops back to select (step 645) and process the next first level set. Referring to FIG. 7, processing identifies CG2 715 as the center of gravity for first level set 707, and places buffer 744 at a location that is twice the buffer distance from source 700 and is in-line between buffer 740 and CG2 715. This looping continues until each first level set is processed, at which point decision 640 branches to "No" branch 648.

Processing iterates the above algorithm based upon the number of buffer stages at step 650. Referring to FIG. 7, processing draws an X-axis line through CG2 710 and creates second level sets 722 and 724. Processing identifies third level center of gravities 720 and 725, which correspond to second level sets 722 and 724, respectively. Next, processing places buffer 746 in-line between buffer 742 and CG3 720, and places buffer 748 in-line between buffer 742 and CG3 725. Likewise, processing draws an X-axis line through CG2 715 and creates second level sets 732 and 734. Processing identifies third level center of gravities 730 and 735, which correspond to second level sets 732 and 734, respectively. Next, processing places buffer 750 in-line between buffer 744 and CG3 730, and places buffer 752 in-line between buffer 744 and CG3 735. In the embodiment discussed above when the Y distance is greater than the X distance, processing draws Y-axis lines through the identified center of gravities instead of X-axis lines as discussed.

Processing continues to iterate the algorithm until a buffer is placed within one buffer distance from the sink components, which are referred to as leaf-level buffers since they are the last buffers before the sink components. At step 660, processing analyzes each leaf-level buffer and replicates the buffer if the fanout to corresponding sink components is larger than a maximum fanout supported by the buffer or if loadcap violations exist. In addition, processing iteratively analyzes each buffer stage proceeding back towards the source component and replicates the buffer if its fanout is larger than maximum fanout or if loadcap violations exist. Processing returns at 670.

Figure 8:
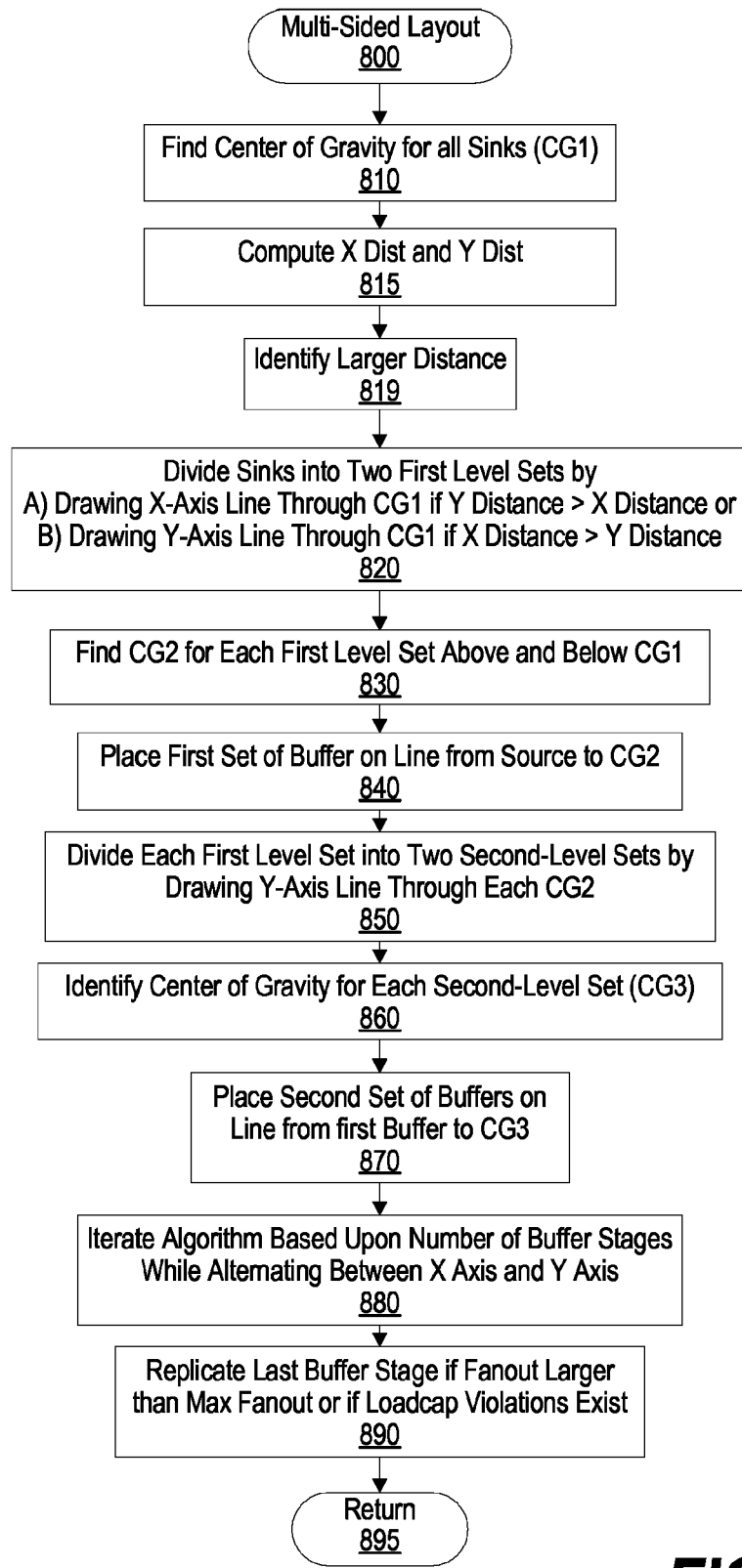
FIG. 8 is a flowchart showing steps taken in using a multi-sided buffer optimization algorithm to optimize a buffer for sink components that are organized in a multi-sided layout configuration.
Figure 9:
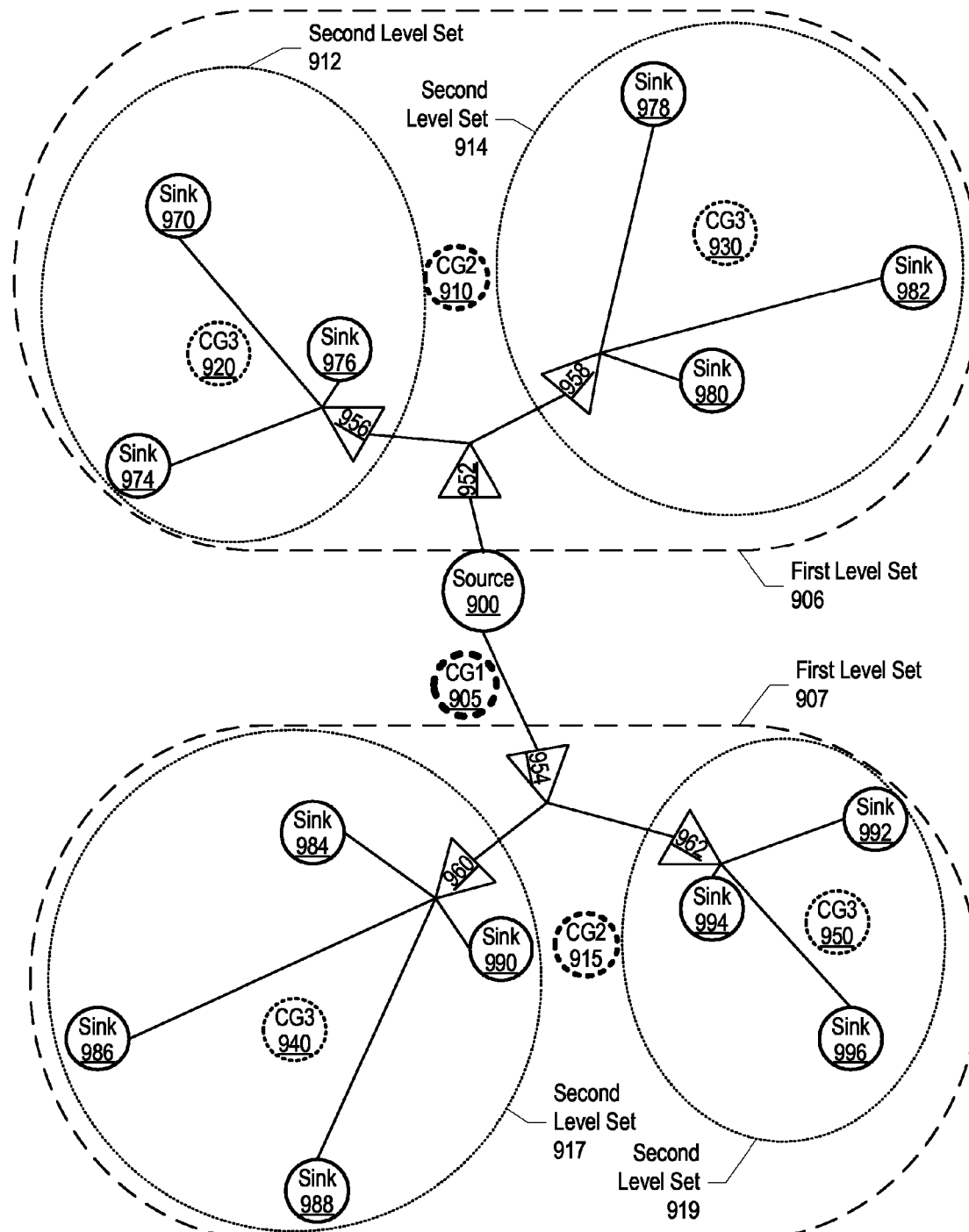
FIG. 9 is an exemplary diagram of an optimized buffer tree for a multi-sided layout.

FIG. 8 is a flowchart showing steps taken in a device development tool using a multi-sided buffer optimization algorithm to optimize a buffer for sink components that are organized in a multi-sided layout configuration. FIG. 9 is an exemplary diagram of a physical layout that includes an optimized buffer tree for a multi-sided layout. Referring to FIG. 8, processing commences at 800, whereupon processing identifies a first level center of gravity (CG1) for all sink components (step 810). Referring to FIG. 9, processing identifies CG1 905 as the first level center of gravity for sink components 970 through 996.

Processing, at step 815, computes an X distance and a Y distance that CG1 is away from the source component. As discussed previously, the X distance is a horizontal distance (X-axis) between the source and CG1 and the Y distance is a vertical distance (Y-axis) between the source and CG1.

Processing, at step 819 identifies whether the X distance or the Y distance is larger. Next, processing divides the sink components into two first level sets by drawing either an X-axis line or a Y-axis line through CG1 based upon whether the X distance is larger than the Y distance (step 820). Referring to FIG. 9, the example shows that the Y distance between source 900 and CG1 905 is larger than the X distance. As such, an X-axis line (horizontal line parallel to the X-axis) is drawn through CG1 905, which results in first level set 906 and first level set 907. Note that this is opposite from the single-sided optimization algorithm discussed in FIGS. 6 and 7. In situations when the X distance is greater than the Y distance, processing draws a Y-axis line (vertical line parallel to the Y-axis) through CG1. For the sake of simplicity, steps 820 through 870 assume that the Y distance is greater than the X distance, such as that shown in FIG. 9.

Once the first level sets are identified, processing identifies a second level center of gravity (CG2) for each of the first level sets (step 830). Referring to FIG. 9, processing identifies CG2 910 as first level set 906's center of gravity and identifies CG2 915 as first level set 907's center of gravity. At step 840, processing places buffers in-line between the source and each of the second level center of gravities. Referring to FIG. 9, processing places buffer 952 in-line between source 900 and CG2 910, and also places buffer 954 in-line between source 900 and CG2 915.

At step 850, processing divides each of the first level sets into two second level sets by drawing an axis line opposite of that drawn in step 820 through each CG2. Again, the embodiment discussed herein assumes that the Y distance is larger than the X distance, which resulted in processing drawing an X-axis line at step 820. As such, processing draws a Y-axis line through each CG2 at step 850. Referring to FIG. 9, processing draws a Y-axis line through CG2 910, which results in second level sets 912 and 914, and also draws a Y-axis line through CG2 915, which results in second level sets 917 and 919.

At step 860, processing identifies a third level center of gravity for each of the second level sets. Referring to FIG. 9, processing identifies CG3 920 as second level set 912's center of gravity; identifies CG3 930 as second level set 914's center of gravity; identifies CG3 940 as second level set 917's center of gravity; and identifies CG3 950 as second level set 919's center of gravity.

Once processing identifies the third level center of gravities, processing places buffers in-line between the buffers placed in step 840 above and each of the third level center of gravities (step 870). Referring to FIG. 9, processing places buffer 956 in-line between buffer 952 and CG3 920; places buffer 958 in-line between buffer 952 and CG3 930; places buffer 960 in-line between buffer 954 and CG3 940; and places buffer 962 in-line between buffer 954 and CG3 950.

Processing iterates the above algorithm based upon the number of buffer stages at step 880 while alternating between drawing an X-axis line and Y-axis line between deeper center of gravity levels. Using the embodiment discussed above, since processing drew Y-axis lines through each CG2 in step 850, processing would draw X-axis lines through each CG3 if the second level sets required division into third level sets. Again, as discussed above, the example discussed assumes that the Y distance between the source and CG1 is larger than the X distance between the source and CG1. In cases when the X distance is larger than the Y distance, steps 820 and 850 would be opposite from how they are described above.

At step 890, processing analyzes each leaf-level buffer and replicates the buffers if the fanout to corresponding sink components is larger than a maximum fanout supported by the buffer or if loadcap violations exist. Processing returns at 895.

Figure 10:
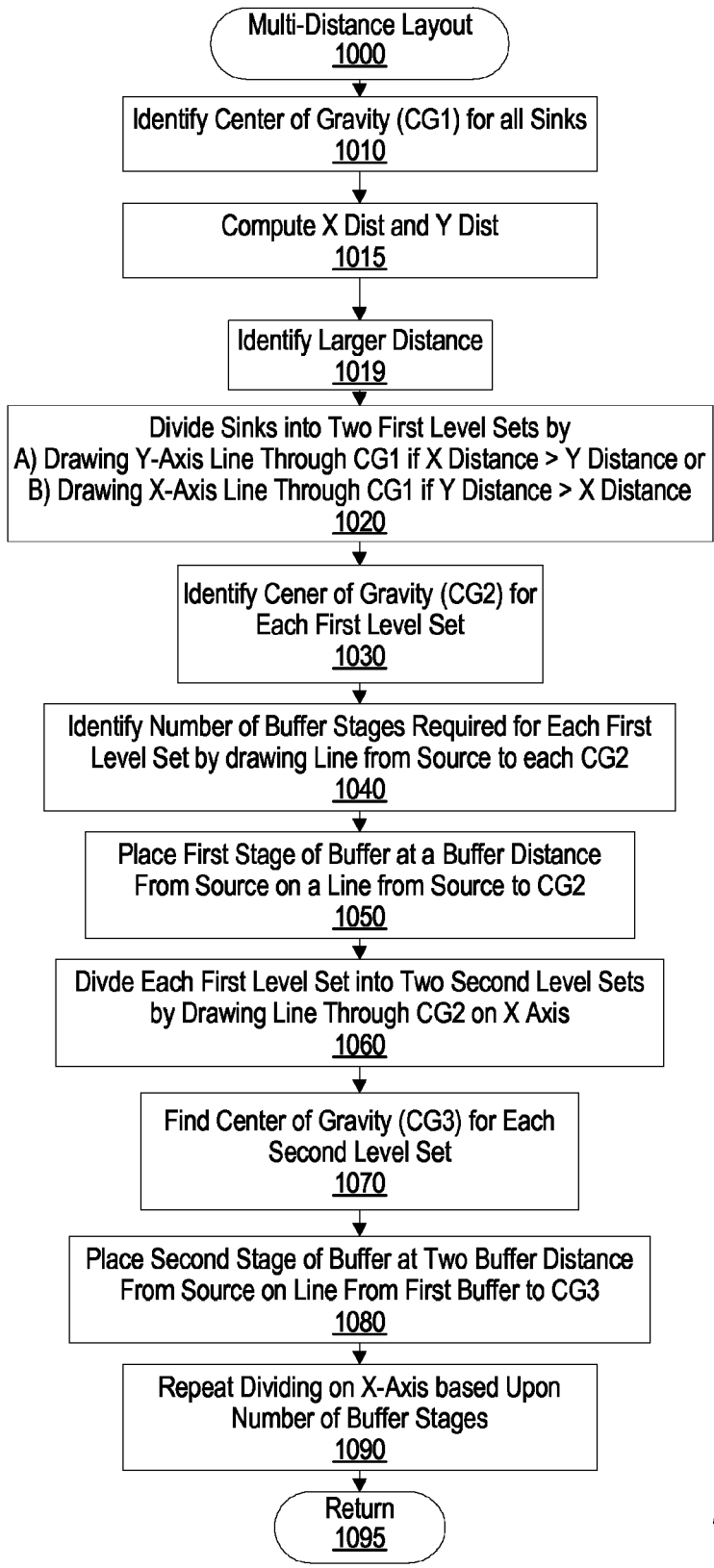
FIG. 10 is a flowchart showing steps taken in using a multi-distance buffer optimization algorithm to optimize a buffer tree for sink components that are organized in a multi-distance layout configuration.
Figure 11:
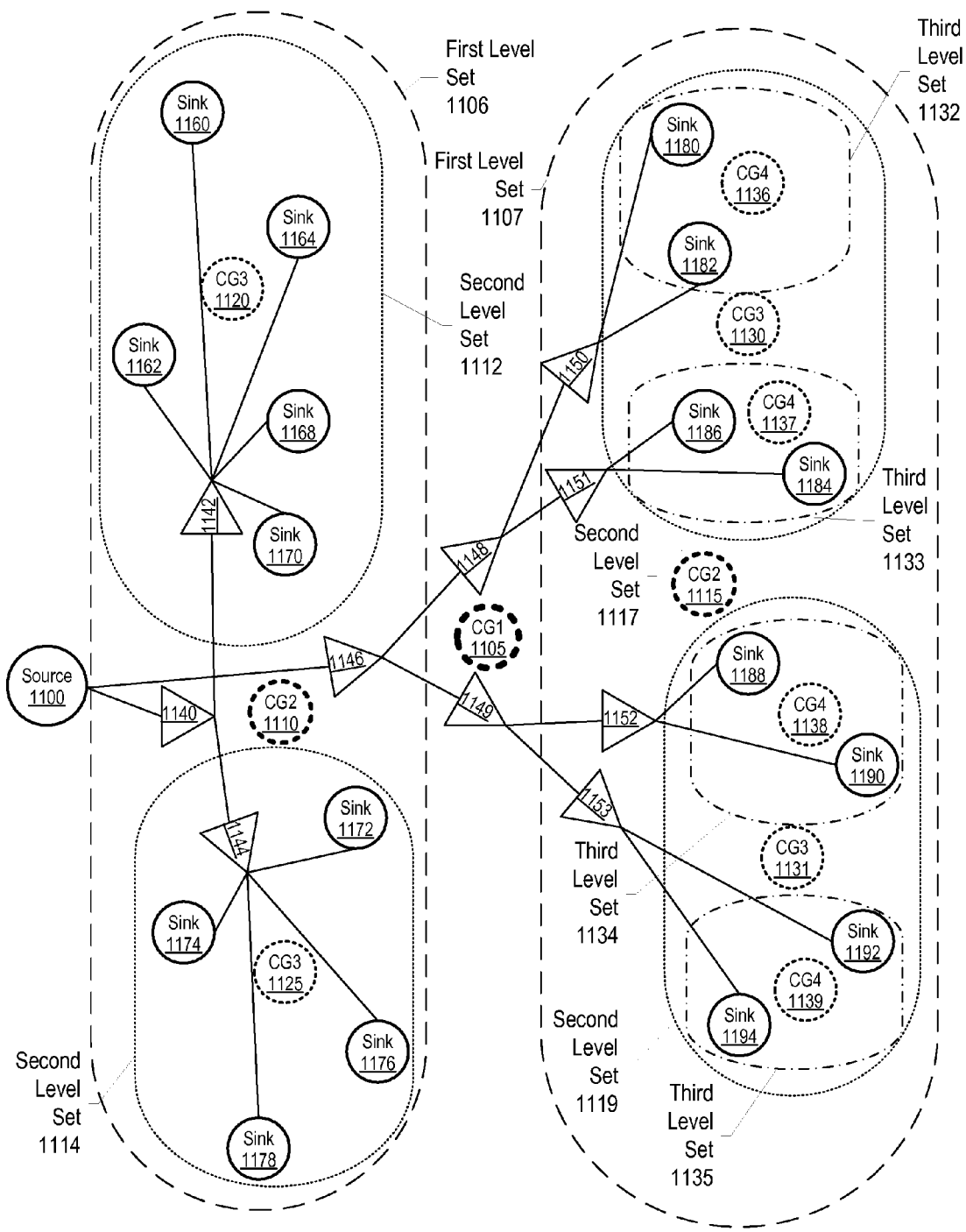
FIG. 11 is an exemplary diagram of an optimized buffer tree for a multi-distance layout.

FIG. 10 is a flowchart showing steps taken in a device development tool using a multi-distance buffer optimization algorithm to optimize a buffer tree for sink components that are organized in a multi-distance layout configuration. FIG. 11 is an exemplary diagram of a physical layout that includes an optimized buffer tree for a multi-distance layout. Referring to FIG. 10, processing commences at 1000, whereupon processing identifies a first level center of gravity (CG1) for all sink components (step 1010). Referring to FIG. 11, processing identifies CG1 1105 as the first level center of gravity for sink components 1160 through 1194.

Processing, at step 1015, computes an X distance and a Y distance that CG1 is away from the source component. As discussed previously, the X distance is a horizontal distance (X-axis) between the source and CG1 and the Y distance is a vertical distance (Y-axis) between the source and CG1.

Processing, at step 1019 identifies whether the X distance or the Y distance is larger. Next, processing divides the sink components into two first level sets by drawing either an X-axis line or a Y-axis line through CG1 based upon whether the X distance is larger than the Y distance (step 1020). Referring to FIG. 11, the example shows that the X distance between source 1100 and CG1 1105 is larger than the Y distance. As such, a Y-axis line (vertical line parallel to the X-axis) is drawn through CG1 1105, which results in first level set 1106 and first level set 1107. In situations when the Y distance is greater than the X distance, processing draws an X-axis line (horizontal line parallel to the X-axis) through CG1. For the sake of simplicity, steps 1030 through 1090 assume that the X distance is greater than the Y distance as shown in FIG. 11.

Once the first level sets are identified, processing identifies a second level center of gravity (CG2) for each of the first level sets (step 1030). Referring to FIG. 11, processing identifies CG2 1110 as first level set 1106's center of gravity and identifies CG2 1115 as first level set 1107's center of gravity. At step 1040, processing identifies a number of buffer stages required for each first level set by drawing a line from the source to each CG2. At step 1050, processing places a first buffer at a buffer distance from the source in-line to each CG2. Referring to FIG. 11, processing places buffer 1140 in-line between source component 1100 and CG2 1110, and places buffer 1146 in-line between source component 1100 and CG2 1115.

At step 1060, processing divides each of the first level sets into two second level sets by drawing an axis line opposite of that drawn in step 1020 through each CG2. Again, the embodiment discussed herein assumes that the X distance is larger than the Y distance, which resulted in processing drawing a Y-axis line at step 1020. As such, processing draws an X-axis line through each CG2 at step 1060. Referring to FIG. 11, processing draws an X-axis line through CG2 1110, which results in second level sets 1112 and 1114, and also draws an X-axis line through CG2 1115, which results in second level sets 1117 and 1119.

At step 1070, processing identifies a third level center of gravity for each of the second level sets. Referring to FIG. 11, processing identifies CG3 1120 as second level set 1112's center of gravity; identifies CG3 1125 as second level set 1114's center of gravity; identifies CG3 1130 as second level set 1117's center of gravity; and identifies CG3 1131 as second level set 1119's center of gravity.

Once processing identifies the third level center of gravities, processing places buffers in-line between the buffers placed in step 1050 above and each of the third level center of gravities (step 1080). Referring to FIG. 11, processing places buffer 1142 in-line between buffer 1140 and CG3 1120; places buffer 1144 in-line between buffer 1140 and CG3 1125; places buffer 1148 in-line between buffer 1146 and CG3 1130; and places buffer 1149 in-line between buffer 1146 and CG3 1131.

Processing repeats dividing the sink component sets using X-axis lines based upon the number of buffer stages at step 1090. Processing uses X-Axis lines to divide the sink component sets because the X distance is larger than the Y distance in this example. When the Y distance is larger than the X distance, processing divides the sink component sets using Y-axis lines in step 1090. Referring to FIG. 11, processing draws an X-axis line through CG3 1130 and creates third level sets 1132 and 1133. Processing also draws an X-axis line through CG3 1131 and creates third level sets 1134 and 1135. In turn, processing identifies center of gravities for each of the third level sets, which are CG4 1136 for third level set 1132; CG4 1137 for third level set 1133; CG4 1138 for third level set 1134; and CG4 for third level set 1135. Next, processing places buffers in-line between the buffers placed in step 1080 above and each of the fourth level center of gravities. As such, processing places buffer 1150 in-line between buffer 1148 and CG4 1136; places buffer 1151 in-line between buffer 1148 and CG4 1137; places buffer 1152 in-line between buffer 1149 and CG4 1138; and places buffer 1153 in-line between buffer 1149 and CG4 1139. Processing returns at 1095.

Figure 12:
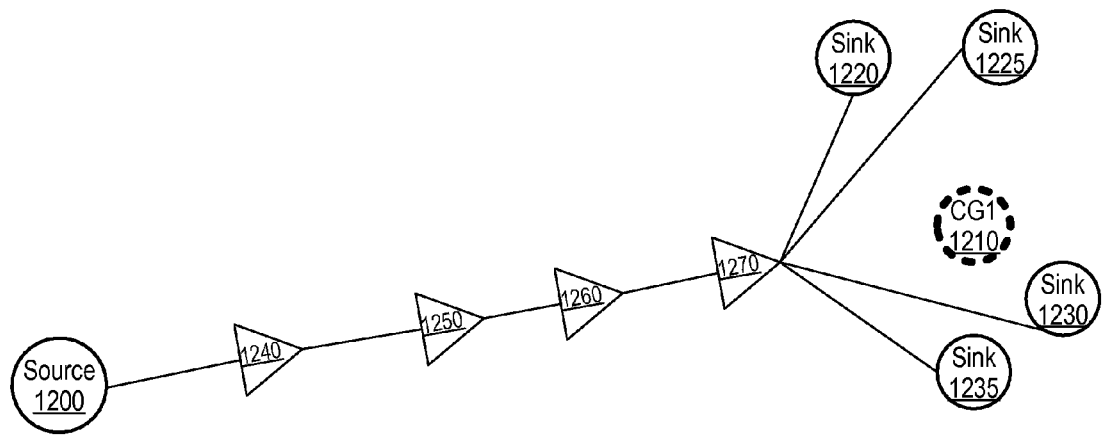
FIG. 12 is a diagram showing a device development tool optimizing a buffer chain from a source component to a sink component set.

FIG. 12 is a diagram showing a device development tool optimizing a buffer chain from a source component to a sink component set. The example shown in FIG. 12 shows that sink components 1220 through 1235 are distant from source component 1200. In these situations, the device development tool identifies a first level center of gravity (CG1 1210) for the set of sink components, and then draws a line from source 1200 to CG1 1210. Next, the device development tool inserts buffers 1240 through 1270 at buffer distances apart along the line drawn between source 1200 and 1210. As those skilled in the art can appreciate, more or less buffers may be required than what is shown in FIG. 11 based upon loadcap values and the drive capability of buffers, which corresponds to the buffer distance. In one embodiment, the device development tool analyzes the leaf-level buffer (buffer 1270) and replicates the buffer if its fanout to sink components 1220 through 1235 is larger than a maximum fanout supported by the buffer or if loadcap violations exist.

Figure 13:
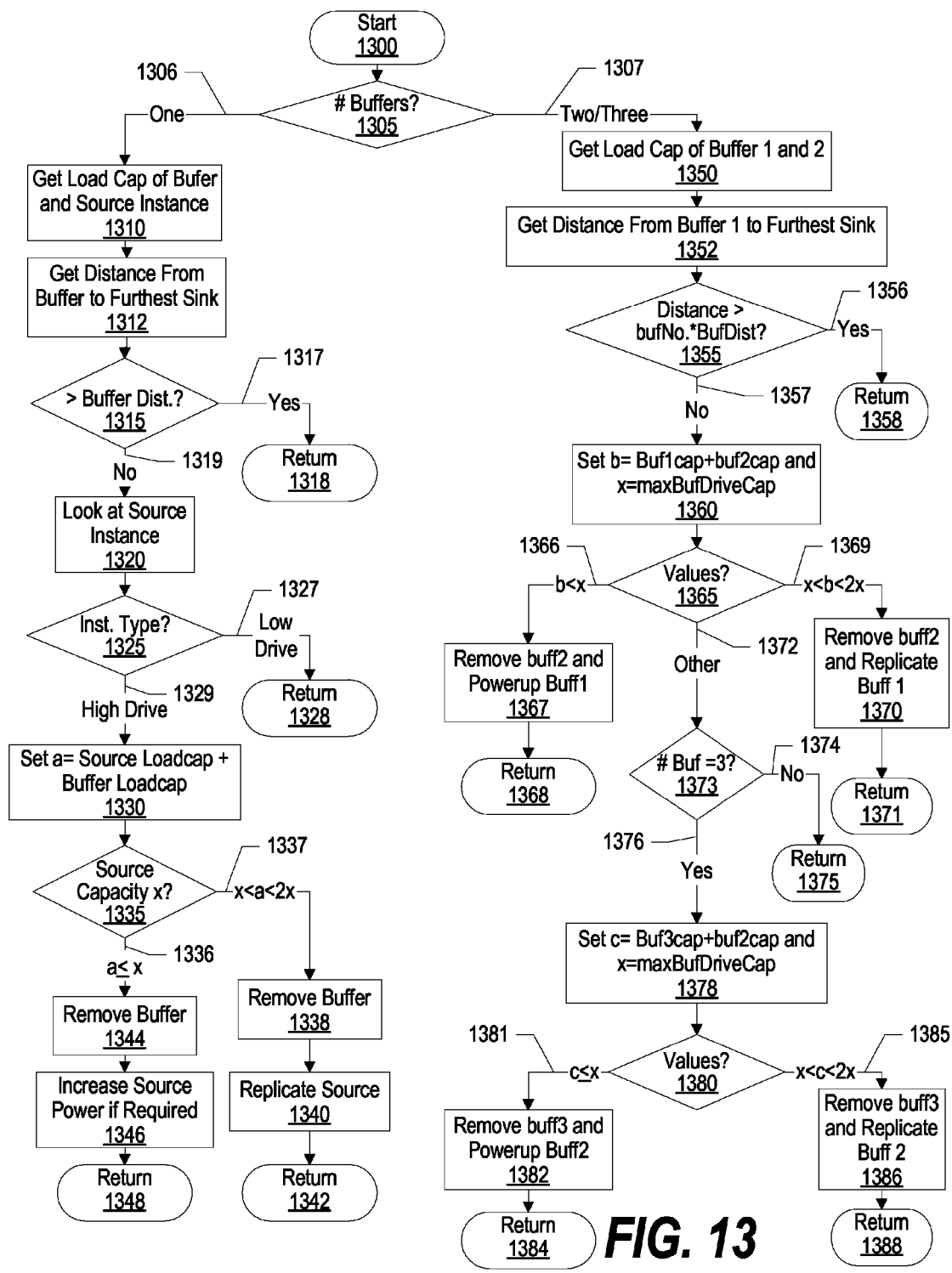
FIG. 13 is a flowchart showing steps taken in decreasing a number of buffers along a path by using a loadcap and distance.

FIG. 13 is a flowchart showing steps taken in a device development tool decreasing a number of buffers along a path by using a loadcap and distance based redundant buffer algorithm. Processing commences at 1300, whereupon a determination is made as to the number of buffers along a critical path, which was identified at step 515 in FIG. 5 (decision 1305). If the number of buffers is one, decision 1305 branches to "One" branch 1306 whereupon processing gets a loadcap value of the buffer and source instance, which is in step 1330 discussed below. At step 1312, processing identifies the distance between the buffer and its furthest sink component.

A determination as to whether the distance between the buffer and its furthest sink is greater than a buffer distance (decision 1315). The buffer distance is a maximum distance that an average size buffer can drive at a particular fanout. The buffer distance is variable depending upon device technology and may have different values for buffer chains and buffer trees. If the distance between the source and sink is greater than the buffer distance, decision 1315 branches to "Yes" branch 1317 whereupon processing returns at 1318 due to the fact that the buffer cannot be removed.

On the other hand, if the distance between the source component and sink component is less than a buffer distance, decision 1315 branches to "No" branch 1319, whereupon processing analyzes the source component instance (step 1320) and identifies its instance type (e.g., low drive or high drive) (decision 1325). If the source instance type is low drive, such as a latch, decision 1325 branches to "Low Drive" branch 1327 whereupon processing returns at 1328.

On the other hand, if the source instance type is high drive, such as a NAND gate, NOR gate, inverter, etcetera, decision 1325 branches to "High Drive" branch 1329, whereupon processing sets "a" equal to the source loadcap plus a buffer loadcap. A determination is made as to "a's" value compared to the source capacity "x" (decision 1335). If the source loadcap plus buffer loadcap is less than or equal to the source capacity, decision 1335 branches to "a$\leq$x" branch 1336 whereupon processing removes the buffer at step 1344 and increase the source power if required at step 1346. For example, a NAND gate may have a drive capability of 50 pico farads (pF) (x) that drives a buffer, which drives other logical gates. In this example, if the distance between the buffer and the logic gate is less than the buffer distance, and the loadcap of the buffer is 15 pF and the loadcap of the NAND gate is 20 pF, their sum is less than 50 pF (x) and, therefore, the processing removes the buffer. As a result, the NAND gate directly drives the logic gate. Processing returns at 1348.

On the other hand, if the source loadcap plus buffer loadcap is greater than the source capacity but less than twice the source capacity, decision 1335 branches to "x<a<2x" branch 1337, whereupon processing removes the buffer at step 1338 and replicates the source at step 1340, such as adding another inverter in parallel with the existing inverter. Processing returns at 1342.

Referring back to decision 1305, if there are two or three buffers on the critical path, decision 1305 branches to "Two/Three" branch 1307. As a reminder, when there are more than three buffers on the critical path, processing branches from FIG. 5 to FIG. 6, 8, or 10, depending upon the sink component layout type. At step 1350, processing gets the loadcaps of the first buffer and the second buffer and, at step 1352, processing identifies the distance from the first buffer to the furthest sink.

A determination is made as to whether the distance is greater than the number of buffers times the buffer distance (decision 1355). If so, decision 1355 branches to "Yes" branch 1356 and returns at 1358 due to the fact that none of the buffers may be removed. On the other hand, if the distance is less than the number of buffers times the buffer distance, decision 1355 branches to "No" branch 1357, whereupon processing sets "b" to equal the first buffer capacitance plus the second buffer capacitance, and sets "x" to equal a maximum buffer drive capacitance (step 1360).

A determination is made as to the value of "b" relative to "x" (decision 1365). If b is less than x, decision 1365 branches to "b<x" branch 1366 whereupon processing removes the second buffer and powers up the first buffer at step 1367 in order to compensate for the removed buffer. Processing returns at 1368. On the other hand, if b is between x and 2x, decision 1365 branches to "x<b<2x" branch 1369 whereupon processing removes the second buffer and replicates the first buffer at step 1370 in order to reduce the number of cascaded buffers on the critical path, thus making the critical path faster. Processing returns at 1371. On the other hand, if b is greater than 2x or if there are three buffers, decision 1365 branches to "Other" branch 1372.

A determination is made as to whether there are three buffers (decision 1373). If there are only two buffers, decision 1373 branches to "No" branch 1374 whereupon processing returns at 1375. On the other hand, if there are three buffers, decision 1373 branches to "Yes" branch 1376, whereupon processing sets "c" equal to the third buffer capacitance plus the second buffer capacitance and sets "x" equal to the maximum buffer drive capacitance (step 1378).

A determination is made as to the value of "c" relative to "x" (decision 1380). If c is less than or equal to x, decision 1380 branches to "c<x" branch 1381 whereupon processing removes the third buffer and powers up the second buffer at step 1382 in order to compensate for the removed buffer. Processing returns at 1384. On the other hand, if c is between x and 2x, decision 1380 branches to "x<c<2x" branch 1385 whereupon processing removes the third buffer and replicates the second buffer at step 1386 in order to reduce the number of cascaded buffers from three down to two on the critical path, making the critical path faster. Processing returns at 1388.

In one embodiment of the invention, a device development tool selects a source component and a plurality of dependent sink components that are included in a device design layout. Next, the device development tool computes a first level center of gravity for the plurality of sink components and then computes an X distance and a Y distance from the source component to the first level center of gravity. The X distance corresponds to an X-axis of the device design layout and the Y distance corresponds to a Y-axis of the device design layout. The device development tool then groups the plurality of sink components into a plurality of sets based upon the X distance in relation to the Y distance. Finally, the device development tool places a plurality of buffers in the device design layout based upon locations of the plurality of sets.

In yet another embodiment of the present invention, a computer program product stores, in a computer readable medium, functional descriptive material that, when executed by an information handling system, causes the information handling system to select a source component and a plurality of dependent sink components that are included in a device design layout. Next, the information handling system computes a first level center of gravity for the plurality of sink components and then computes an X distance and a Y distance from the source component to the first level center of gravity. The X distance corresponds to an X-axis of the device design layout and the Y distance corresponds to a Y-axis of the device design layout. The information handling system then groups the plurality of sink components into a plurality of sets based upon the X distance in relation to the Y distance. Finally, the information handling system places a plurality of buffers in the device design layout based upon locations of the plurality of sets.

In yet another embodiment of the present invention, the information handling system comprises one or more processors; a memory accessible by at least one of the processors; a nonvolatile storage area accessible by at least one of the processors; and a set of instructions stored in the memory and executed by at least one of the processors that enables the information handling system to select a source component and a plurality of dependent sink components that are included in a device design layout. Next, the information handling system computes a first level center of gravity for the plurality of sink components and then computes an X distance and a Y distance from the source component to the first level center of gravity. The X distance corresponds to an X-axis of the device design layout and the Y distance corresponds to a Y-axis of the device design layout. The information handling system then groups the plurality of sink components into a plurality of sets based upon the X distance in relation to the Y distance. Finally, the information handling system places a plurality of buffers in the device design layout based upon locations of the plurality of sets.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting a source component included in a device design layout;
   identifying a plurality of sink components that depend upon the source component, the plurality of sink components included in the device design layout;
   computing, by a processor, a first level center of gravity for the plurality of sink components;
   computing, by the processor, an X distance and a Y distance from the source component to the first level center of gravity, the X distance corresponding to an X-axis of the device design layout and the Y distance corresponding to a Y-axis of the device design layout;
   determining whether the X distance is greater than the Y distance;

in response to determining that the X distance is greater than the Y distance, dividing the plurality of sink components into two first level sets by computing an X-axis line through the first level center of gravity, the X-axis line parallel to the X-axis;

in response to determining that the Y distance is greater than the X distance, dividing the plurality of sink components into the two first level sets by computing a Y-axis line through the first level center of gravity, the Y-axis line parallel to the Y-axis; and placing a plurality of buffers in the device design layout based upon locations of a plurality of second level center of gravities of the two first level sets, wherein the placement of the plurality of buffers optimizes one or more critical paths between the source component and one or more of the plurality of sink components.

2. The method of claim 1 wherein a layout type of the plurality of sink components is a single-sided layout, the method further comprising:

placing a first buffer at a buffer distance in-line between the source component and the first level center of gravity, the first buffer included in the plurality of buffers;

selecting one of the first level sets;

computing one of the plurality of second level center of gravities for the selected first level set; and placing a second buffer in-line between the first buffer and the computed second level center of gravity, the second buffer included in the plurality of buffers.

3. The method of claim 1 wherein a layout type of the plurality of sink components is a multi-sided layout, the method further comprising:

in response to determining that the X distance is greater than the Y distance, the method further comprises:

selecting one of the first level sets;

computing one of the plurality of second level center of gravities for the selected first level set;

dividing the selected first level set into two second level sets by computing an X-axis line through the computed second level center of gravity, the X-axis line parallel to the X-axis;

selecting one of the second level sets;

computing a third level center of gravity for the selected second level set; and dividing the selected second level set into two third level sets by computing a different Y-axis line through the third level center of gravity, the different Y-axis line parallel to the Y-axis;

in response to determining that the Y distance is greater than the X distance, the method further comprises:

selecting one of the first level sets;

computing one of the plurality of second level center of gravities for the selected first level set;

dividing the selected first level set into two second level sets by computing the Y-axis line through the computed second level center of gravity;

selecting one of the second level sets;

computing a third level center of gravity for the selected second level set; and dividing the selected second level set into two third level sets by computing a different X-axis line through the third level center of gravity, the different X-axis line parallel to the X-axis;

placing a first buffer in-line between the source component and the second level center of gravity, the first buffer included in the plurality of buffers; and placing a second buffer in-line between the second buffer and the third level center of gravity, the second buffer included in the plurality of buffers.

4. The method of claim 1 wherein a layout type of the plurality of sink components is a multi-distance layout, the method further comprising:

in response to determining that the X distance is greater than the Y distance, the method further comprises:

selecting one of the first level sets;

computing one of the plurality of second level center of gravities for the selected first level set;

dividing the selected first level set into two second level sets by computing an X-axis line through the computed second level center of gravity, the X-axis line parallel to the X-axis;

selecting one of the second level sets;

computing a third level center of gravity for the selected second level set; and dividing the selected second level set into two third level sets by computing a different X-axis line through the third level center of gravity, the different X-axis line parallel to the X-axis;

in response to determining that the Y distance is greater than the X distance, the method further comprises:

selecting one of the first level sets;

computing one of the plurality of second level center of gravities for the selected first level set;

dividing the selected first level set into two second level sets by computing the Y-axis line through the computed second level center of gravity;

selecting one of the second level sets;

computing a third level center of gravity for the selected second level set; and dividing the selected second level set into two third level sets by computing a different Y-axis line through the third level center of gravity, the different Y-axis line parallel to the Y-axis;

placing a first buffer at a buffer distance in-line between the source component and the second level center of gravity, the first buffer included in the plurality of buffers; and placing a second buffer in-line between the first buffer and the third level center of gravity, the second buffer included in the plurality of buffers.

5. The method of claim 1 further comprising:

sequentially trace one of the one or more critical paths between the source component and one of the plurality of sink components;

identify an initial buffer sequence on the traced critical path;

determining that an amount of initial buffers lie along the traced critical path is greater than three;

in response to determining that the amount of initial buffers is greater than three, deleting the initial buffer sequence; and identifying a layout type of the plurality of sink components.

6. The method of claim 5 wherein the method is performed after an initial routing that couples the initial buffers to the source component and the plurality of sink components.

7. The method of claim 1 further comprising:

replicating a last leaf-level buffer stage if a fanout for the last leaf-level buffer stage is larger than a maximum fanout or if one or more load capacitance violations exist.

8. The method of claim 1 further comprising:
computing a Z distance from the first level center of gravity, the z distance corresponding to a Z distance in a third dimension that is perpendicular to the X distance and the Y distance; and
utilizing the Z distance during the grouping of the plurality of sink components and the placement of the buffers.

9. The method of claim 1 further comprising:
creating a device utilizing the device design layout that includes the placed plurality of buffers that are based upon locations of the plurality of sets; and
wherein the device is an integrated circuit.

10. A computer program product stored in a non-transitory computer readable medium, comprising functional descriptive material that, when executed by an information handling system, causes the information handling system to perform actions that include:
selecting a source component included in a device design layout;
identifying a plurality of sink components that depend upon the source component, the plurality of sink components included in the device design layout;
computing a first level center of gravity for the plurality of sink components;
computing an X distance and a Y distance from the source component to the first level center of gravity, the X distance corresponding to an X-axis of the device design layout and the Y distance corresponding to a Y-axis of the device design layout;
determining whether the X distance is greater than the Y distance;
in response to determining that the X distance is greater than the Y distance, dividing the plurality of sink components into two first level sets by computing an X-axis line through the first level center of gravity, the X-axis line parallel to the X-axis;
in response to determining that the Y distance is greater than the X distance, dividing the plurality of sink components into the two first level sets by computing a Y-axis line through the first level center of gravity, the Y-axis line parallel to the Y-axis; and
placing a plurality of buffers in the device design layout based upon locations of a plurality of second level center of gravities of the two first level sets, wherein the placement of the plurality of buffers optimizes one or more critical paths between the source component and one or more of the plurality of sink components.

11. The computer program product of claim 10 wherein a layout type of the plurality of sink components is a single-sided layout, the information handling system further performing actions that include:
placing a first buffer at a buffer distance in-line between the source component and the first level center of gravity, the first buffer included in the plurality of buffers;
selecting one of the first level sets;
computing one of the plurality of second level center of gravities for the selected first level set; and
placing a second buffer in-line between the first buffer and the second level center of gravity, the second buffer included in the plurality of buffers.

12. The computer program product of claim 10 wherein a layout type of the plurality of sink components is a multi-sided layout, the information handling system further performing actions that include:
determining whether the X distance is greater than the Y distance;
in response to determining that the X distance is greater than the Y distance, the information handling system further performing actions that include:
selecting one of the first level sets;
computing one of the plurality of second level center of gravities for the selected first level set;
dividing the selected first level set into two second level sets by computing an X-axis line through the computed second level center of gravity, the X-axis line parallel to the X-axis;
selecting one of the second level sets;
computing a third level center of gravity for the selected second level set; and
dividing the selected second level set into two third level sets by computing a different Y-axis line through the third level center of gravity, the different Y-axis line parallel to the Y-axis;
in response to determining that the Y distance is greater than the X distance, the information handling system further performing actions that include:
selecting one of the first level sets;
computing one of the plurality of second level center of gravities for the selected first level set;
dividing the selected first level set into two second level sets by computing the Y-axis line through the computed second level center of gravity;
selecting one of the second level sets;
computing a third level center of gravity for the selected second level set; and
dividing the selected second level set into two third level sets by computing a different X-axis line through the third level center of gravity, the different X-axis line parallel to the X-axis;
placing a first buffer in-line between the source component and the second level center of gravity, the first buffer included in the plurality of buffers; and
placing a second buffer in-line between the second buffer and the third level center of gravity, the second buffer included in the plurality of buffers.

13. The computer program product of claim 10 wherein a layout type of the plurality of sink components is a multi-distance layout, the information handling system further performing actions that include:
in response to determining that the X distance is greater than the Y distance, the information handling system further performing actions that include:
selecting one of the first level sets;
computing one of the plurality of second level center of gravities for the selected first level set;
dividing the selected first level set into two second level sets by computing an X-axis line through the computed second level center of gravity, the X-axis line parallel to the X-axis;
selecting one of the second level sets;
computing a third level center of gravity for the selected second level set; and
dividing the selected second level set into two third level sets by computing a different X-axis line through the third level center of gravity, the different X-axis line parallel to the X-axis;
in response to determining that the Y distance is greater than the X distance, the information handling system further performing actions that include:
selecting one of the first level sets;
computing one of the plurality of second level center of gravities for the selected first level set;

dividing the selected first level set into two second level sets by computing the Y-axis line through the computed second level center of gravity;

selecting one of the second level sets;

computing a third level center of gravity for the selected second level set; and dividing the selected second level set into two third level sets by computing a different Y-axis line through the third level center of gravity, the different Y-axis line parallel to the Y-axis;

placing a first buffer at a buffer distance in-line between the source component and the second level center of gravity, the first buffer included in the plurality of buffers; and placing a second buffer in-line between the first buffer and the third level center of gravity, the second buffer included in the plurality of buffers.

14. The computer program product of claim 10 wherein the information handling system further performs actions that include:

sequentially trace one of the one or more critical paths between the source component and one of the plurality of sink components;

identify an initial buffer sequence on the traced critical path;

determining that an amount of initial buffers lie along the traced critical path is greater than three;

in response to determining that the amount of initial buffers is greater than three, deleting the initial buffer sequence; and identifying a layout type of the plurality of sink components.

15. The computer program product of claim 10 wherein the information handling system further performs actions that include:

computing a Z distance from the first level center of gravity, the z distance corresponding to a Z distance in a third dimension that is perpendicular to the X distance and the Y distance; and utilizing the Z distance during the grouping of the plurality of sink components and the placement of the buffers.

16. An information handling system comprising:

one or more processors;

a memory accessible by at least one of the processors;

a nonvolatile storage area accessible by at least one of the processors;

a set of instructions stored in the memory and executed by at least one of the processors in order to perform actions of:

selecting a source component included in a device design layout;

identifying a plurality of sink components that depend upon the source component, the plurality of sink components included in the device design layout;

computing a first level center of gravity for the plurality of sink components;

computing an X distance and a Y distance from the source component to the first level center of gravity, the X distance corresponding to an X-axis of the device design layout and the Y distance corresponding to a Y-axis of the device design layout;

determining whether the X distance is greater than the Y distance;

in response to determining that the X distance is greater than the Y distance, dividing the plurality of sink components into two first level sets by computing an X-axis line through the first level center of gravity, the X-axis line parallel to the X-axis;

in response to determining that the Y distance is greater than the X distance, dividing the plurality of sink components into the two first level sets by computing a Y-axis line through the first level center of gravity, the Y-axis line parallel to the Y-axis; and placing a plurality of buffers in the device design layout based upon locations of a plurality of second level center of gravities of the two first level sets, wherein the placement of the plurality of buffers optimizes one or more critical paths between the source component and one or more of the plurality of sink components.

17. The information handling system of claim 16 wherein a layout type of the plurality of sink components is a single-sided layout, the information handling system further performing actions that include:

placing a first buffer at a buffer distance in-line between the source component and the first level center of gravity, the first buffer included in the plurality of buffers;

selecting one of the first level sets;

computing one of the plurality of second level center of gravities for the selected first level set; and placing a second buffer in-line between the first buffer and the second level center of gravity, the second buffer included in the plurality of buffers.

18. The information handling system of claim 16 wherein a layout type of the plurality of sink components is a multi-sided layout, the information handling system further performing actions that include:

in response to determining that the X distance is greater than the Y distance, the information handling system further performing actions that include:

selecting one of the first level sets;

computing one of the plurality of second level center of gravities for the selected first level set;

dividing the selected first level set into two second level sets by computing an X-axis line through the computed second level center of gravity, the X-axis line parallel to the X-axis;

selecting one of the second level sets;

computing a third level center of gravity for the selected second level set; and dividing the selected second level set into two third level sets by computing a different Y-axis line through the third level center of gravity, the different Y-axis line parallel to the Y-axis;

in response to determining that the Y distance is greater than the X distance, the information handling system further performing actions that include:

selecting one of the first level sets;

computing one of the plurality of second level center of gravities for the selected first level set;

dividing the selected first level set into two second level sets by computing the Y-axis line through the computed second level center of gravity;

selecting one of the second level sets;

computing a third level center of gravity for the selected second level set; and dividing the selected second level set into two third level sets by computing a different X-axis line through the third level center of gravity, the different X-axis line parallel to the X-axis;

placing a first buffer in-line between the source component and the second level center of gravity, the first buffer included in the plurality of buffers; and placing a second buffer in-line between the second buffer and the third level center of gravity, the second buffer included in the plurality of buffers.

19. The information handling system of claim 16 wherein a layout type of the plurality of sink components is a multi-distance layout, the information handling system further performing actions that include:
  in response to determining that the X distance is greater than the Y distance, the information handling system further performing actions that include:
    selecting one of the first level sets;
    computing one of the plurality of second level center of gravities for the selected first level set;
    dividing the selected first level set into two second level sets by computing an X-axis line through the computed second level center of gravity, the X-axis line parallel to the X-axis;
    selecting one of the second level sets;
    computing a third level center of gravity for the selected second level set; and
    dividing the selected second level set into two third level sets by computing a different X-axis line through the third level center of gravity, the different X-axis line parallel to the X-axis;
  in response to determining that the Y distance is greater than the X distance, the information handling system further performing actions that include:
    selecting one of the first level sets;
    computing one of the plurality of second level center of gravities for the selected first level set;
    dividing the selected first level set into two second level sets by computing the Y-axis line through the computed second level center of gravity;
    selecting one of the second level sets;
    computing a third level center of gravity for the selected second level set; and
    dividing the selected second level set into two third level sets by computing a different Y-axis line through the third level center of gravity, the different Y-axis line parallel to the Y-axis;
  placing a first buffer at a buffer distance in-line between the source component and the second level center of gravity, the first buffer included in the plurality of buffers; and
  placing a second buffer in-line between the first buffer and the third level center of gravity, the second buffer included in the plurality of buffers.

20. The information handling system of claim 16 wherein the information handling system further performs actions that include:
  sequentially trace one of the one or more critical paths between the source component and one of the plurality of sink components;
  identify an initial buffer sequence on the traced critical path;
  determining that an amount of initial buffers lie along the traced critical path is greater than three;
  in response to determining that the amount of initial buffers is greater than three, deleting the initial buffer sequence; and
  identifying a layout type of the plurality of sink components.

* * * * *